United States Patent [19]

Hattori et al.

[11] 4,345,569
[45] Aug. 24, 1982

[54] INTAKE SYSTEM FOR INTERNAL COMBUSTION ENGINES

[75] Inventors: Tadashi Hattori; Siniti Mukainakano; Hitoshi Yoshida, all of Okazaki, Japan

[73] Assignee: Nippon Soken, Inc., Nishio, Japan

[21] Appl. No.: 107,638

[22] Filed: Dec. 27, 1979

[30] Foreign Application Priority Data

Dec. 27, 1978 [JP] Japan ............................ 53/162709

[51] Int. Cl.³ ............................................ F02M 31/00
[52] U.S. Cl. .................................. 123/549; 123/552; 261/142; 219/207
[58] Field of Search .................. 123/549, 552, 590; 261/142; 219/206, 207

[56] References Cited

U.S. PATENT DOCUMENTS

| | | | |
|---|---|---|---|
| 3,915,137 | 10/1975 | Evans | 123/549 |
| 3,930,477 | 1/1976 | Jordan | 123/549 |
| 4,108,125 | 8/1978 | Marcoux | 123/549 |
| 4,141,327 | 2/1979 | Marcoux | 123/552 |
| 4,303,050 | 12/1981 | Platzer | 123/549 |
| 4,308,845 | 1/1982 | Saeto | 123/549 |

Primary Examiner—Ronald H. Lazarus
Attorney, Agent, or Firm—Cushman, Darby & Cushman

[57] ABSTRACT

An intake system for an internal combustion engine comprises an intake pipe structure connected through an intake manifold to cylinders of the engine, a fuel injection valve for injecting fuel into the intake pipe structure to form an air-fuel mixture, a throttle valve disposed in the intake pipe structure, and a baffle plate disposed in the intake pipe structure between the fuel injection valve and the throttle valve for promoting fuel atomization. The baffle plate has a surface which faces the fuel injection valve with a predetermined distance from the latter in order that the fuel injected from the fuel injection valve may impinge on the surface, and an outer edge spaced from an inner wall surface of the intake pipe structure to define a mixture passage therebetween. The baffle plate is made of a ceramic material having positive resistance-temperature characteristic and definite Curie point and adapted to be heated when electric current is applied thereto, so that it may be maintained at a temperature appropriate to cause preferable atomization of the fuel impinged on the baffle plate surface.

10 Claims, 6 Drawing Figures

INTAKE SYSTEM FOR INTERNAL COMBUSTION ENGINES

BACKGROUND OF THE INVENTION

The present invention relates to an intake system for an internal combustion engine which may considerably facilitate the evaporation and atomization of the fuel charged into the intake system.

In general, the conventional intake systems for internal combustion engines comprise a fuel supply system including a carburetor or a fuel injection valve, a butterfly type throttle valve disposed within an intake pipe and an intake manifold for distributing the air-fuel mixture into cylinders of the engine.

With the intake systems of the type described above, uneven or nonuniform distribution or charge of the air-fuel mixture into the engine cylinders tends to occur very frequently, resulting in the decrease in engine performance and in the increase of pollutant emission. Such problems are mainly caused by the fact that the fuel which adheres to the wall surface of the intake pipe flows in the form of film toward the respective cylinders so that the air-fuel ratio of the charge drawn varies from one cylinder to another. The adhesion of the fuel to the walls of the intake pipe in turn is caused by the fact that the fuel has not been atomized satisfactorily.

Especially in the intake systems of the type wherein the fuel injection valve is disposed at the upstream of the throttle valve, the fuel injection pressure is considerably high positive pressure so that the fuel is injected and sprayed independently of the conditions of the air flow. As a result, even when the fuel is sprayed uniformly in the intake pipe, a lean mixture is produced at the portions where the air flows at high velocities while a rich mixture is produced at the portions where the air flows at low velocities. Consequently, the air-fuel ratios of the charges drawn into the respective cylinders vary widely from one cylinder to another.

SUMMARY OF THE INVENTION

It is therefore a primary object of the present invention to provide an intake system for an internal combustion engine which may distribute uniformly the air-fuel mixture of a uniform air-fuel ratio to respective cylinders.

In accordance with the invention, there is provided an intake system for an internal combustion engine comprising: an intake pipe structure, fuel supply means for supplying fuel into the intake pipe structure to form an air-fuel mixture, an intake manifold connected between the intake pipe structure and cylinders of the engine for distributing the air-fuel mixture into the cylinders, a throttle valve disposed in the intake pipe structure between the fuel supply means and the intake manifold for controlling an amount of the air-fuel mixture to be charged into the cylinders, baffle means disposed in the intake pipe structure between the fuel supply means and the throttle valve in opposition to the fuel supply means with a predetermined distance from the latter, and having an outer edge spaced from an inner wall surface of the intake pipe structure to define an opening therebetween, the baffle means including a baffle member made of a ceramic material having positive resistance-temperature characteristic and definite Curie point and adapted to be heated when electric current is applied thereto, and power supply means for supplying electric current to the baffle means.

The above and other objects, features and advantages of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

First Embodiment, FIGS. 1 through 4

Figure 1:
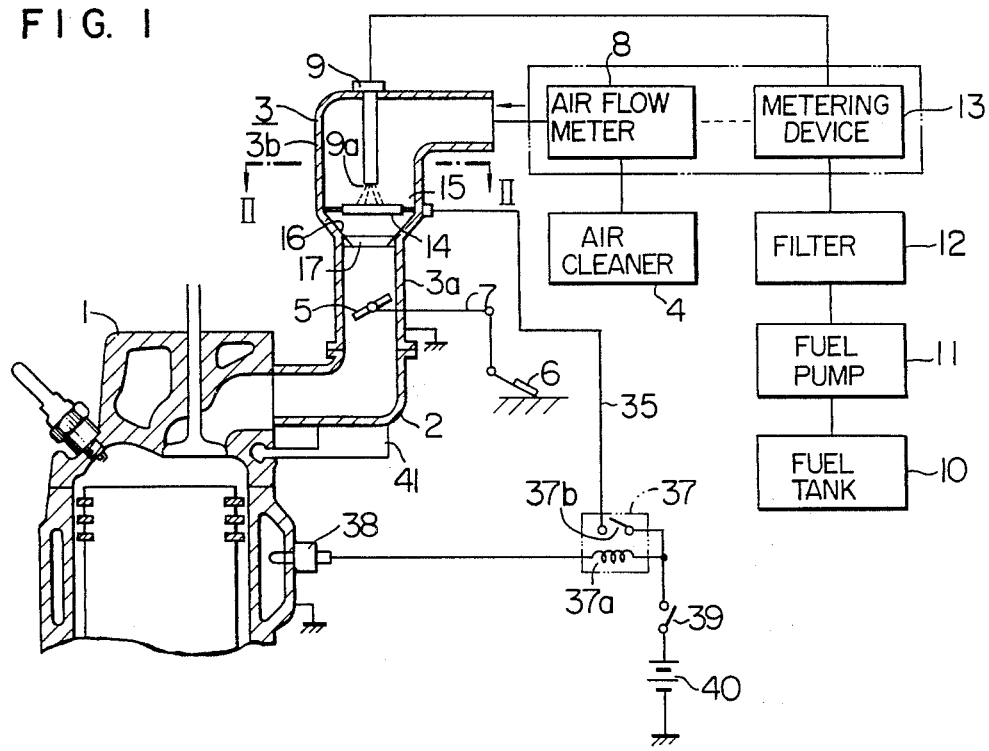
FIG. 1 is a diagrammatic view of a first embodiment of an intake system in accordance with the present invention.

Referring to FIGS. 1 through 4, the first embodiment of the present invention will be described in detail in conjunction with a spark ignition, multi-cylinder, four-cycle, internal combustion automotive engine 1 having an intake manifold 2 connected to an intake pipe structure 3 of circular cross section including a small- or reduced-diameter portion 3a and a large- or enlarged-diameter portion 3b connected to the small-diameter portion 3a through a downwardly converging portion 16.

A butterfly type throttle valve 5 disposed in the small-diameter portion 3a of the intake pipe structure 3 is operatively connected through a linkage 7 to an accelerator pedal 6 so that the area of the opening between the small-diameter wall portion 3a and the throttle valve 5 may be varied depending upon the degree of depression of the accelerator pedal 6 as is well known in the art.

The intake pipe structure 3 is connected to an air cleaner 4 and an air flow meter 8 is disposed in the passage communicating the air cleaner 4 with the air intake pipe structure 3. The air flow meter 8 is for instance of the conventional orifice type wherein the flow rate of the air passing through the opening between the throttle valve 5 and the intake pipe structure 3 (the small-diameter portion 3a) may be detected by maintaining the pressure difference across an air flow check valve (not shown) disposed at the upstream of the throttle valve 5 constant.

A fuel injection valve 9 mounted on the top of the intake pipe structure 3 is communicated with a fuel supply system including a fuel metering device 13, a fuel filter 12, a fuel pump 11 and a fuel tank 10. The fuel metering device 13 is operatively connected to the air flow meter 8 in such a way that the fuel may be metered in response to the air flow rate detected by the flow meter 8. As a result, the quantity or weight of the fuel supplied may become proportional to the quantity or weight of the air supplied so that the air-fuel ratio may be maintained constant.

Figure 4:
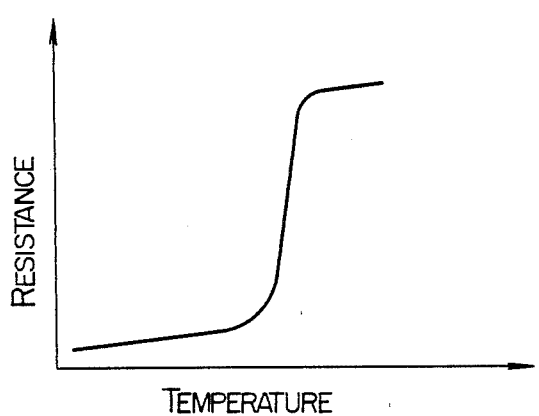
FIG. 4 shows a resistance-temperature characteristic curve of the baffle means shown in FIG. 3.

A disk-shaped baffle 14 is disposed in the large-diameter portion 3b of the intake pipe structure 3 between the nozzle 9a of the fuel injection valve 9 and the throttle valve 5. The baffle 14 is made of a ceramic material such as balium titanate (BaTiO$_3$) which has positive resistance-temperature characteristic and definite Curie point and is adapted to be heated when electric current is applied thereto. As shown in FIG. 4, the ceramic material has the positive resistance-temperature characteristic, i.e., the resistance of the ceramic material increases in the positive direction with the increase in the temperature thereof in the positive direction. Further, the ceramic material has the definite Curie point or temperature at which resistance increases abruptly. Thus, when the electric current is applied to the baffle 14, the temperature of the latter is maintained substantially constant since the resistance increased at the Curie point restricts the electric current to flow through the baffle 14.

Preferably, the distance between the nozzle 9a and the baffle 14 is 20 mm when the fuel injection valve 9 is of the swirling injection type, and is 30 mm in the case of the straight fuel injection type. The opening or mixture passage 15 between the baffle 14 and the large-diameter portion 3b of the intake pipe structure 3 is so selected that its area may be equal to the area of the opening between the throttle valve 5 and the small-diameter portion 3a of the intake pipe structure 3 when the throttle valve is fully opened.

A ring-shaped deflector 17 is attached to the lower end of the downwardly converging portion 16 and is also converged downwardly toward the axis of the intake pipe structure.

Figure 2:
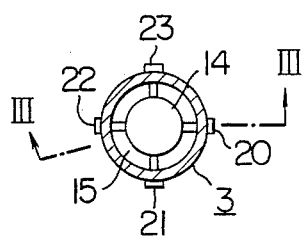
FIG. 2 is a sectional view taken along the line II—II in FIG. 1.
Figure 3:
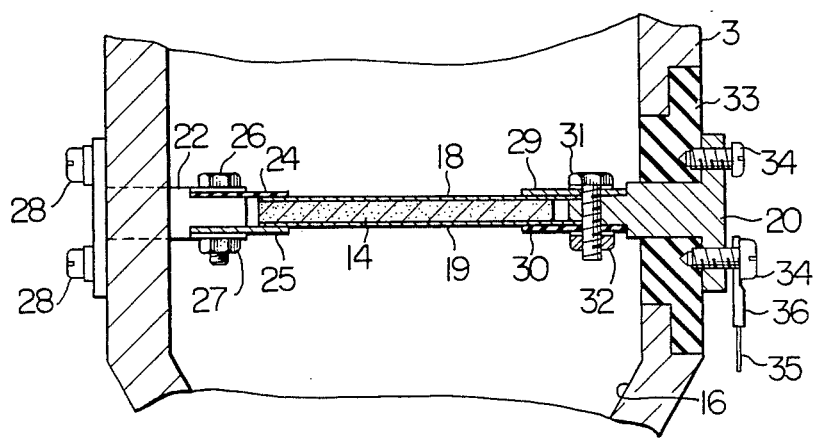
FIG. 3 is a sectional view, on enlarged scale, taken along the line III—III in FIG. 2 showing the detailed construction of a baffle means.

Next, referring to FIGS. 1, 2 and 3, the major surfaces, or upper and lower surfaces, of the baffle 14 are formed with thin platinum film electrodes 18 and 19 by any suitable methods such as chemical plating and paste sintering. The baffle 14 is supported in the large-diameter portion 3b by four equiangularly spaced holders 20 through 23 made of sintered carbon as best shown in FIG. 2. The three holders 21, 22 and 23 are substantially similar in construction so that it will suffice to explain only the holder 22. As best shown in FIG. 3, the holder 22 comprises in general a flange which is securely attached to the outer wall surface of the intake pipe structure 3 with screws 28 and a stem portion which radially inwardly extends into the intake pipe structure 3 through the wall thereof. The baffle 14 is clamped between a rectangular isolation plate 24 and a rectangular metal plate 25 which in turn are securely mounted on the stem portion of the holder 22 with a bolt 26 and a nut 27. The isolation plate 24 is made of a heat resisting electrically insulating material such as glass epoxy resins while the metal or conductive plate 25 is made of an electrically conductive material such as copper. The isolation plate 24 is made into contact with the upper electrode 18 while the metal or conductive plate 25, with the lower electrode 19 so that the electrode 19 is electrically connected to the intake pipe structure 3 which is grounded.

Referring still to FIG. 3, the holder 20 also comprises a stem portion extending through a mounting block 33 securely press fitted into a mating opening formed through the wall of the intake pipe structure 3 and a flange securely attached to the mounting block 33 with screws 34. The baffle 14 is clamped between a rectangular metal or conductive plate 29 made of copper and a rectangular isolation plate 30 made of a heat resisting, electrically insulating material such as glass epoxy resins. The metal or conductive plate 29 which is made into contact with the upper electrode 18 and the isolation plate 30 which is made into contact with the lower plate 19 are securely mounted on the stem portion of the holder 20 with a bolt 31 and a nut 32. The mounting block 33 is made of a heat resisting, electrically insulating material such as glass epoxy resins.

One end of a lead wire 35 is securely connected to a terminal 36 which in turn is clamped to the flange portion of the holder 20 with the screw 34, while the other end of the lead wire 35 is connected through a relay 37 and an engine switch 39 to the positive terminal of a battery 40 (See FIG. 1).

Referring back to FIG. 1, the upper electrode 18 of the baffle 14 is connected through the contact 37b of the relay 37 and the engine switch 39 to the battery 40 while a bimetal type temperature sensor 38 for sensing the temperature of the cooling water is connected through the relay coil 37a and the engine switch 39 to the positive terminal of the battery 40. The temperature sensor 38 is so designed and constructed that when the cooling water is less than 50° C., the temperature sensor 38 closes its contact but when the cooling water rises above 50° C. it opens its contact.

The cooling water is made to pass through a cooling water passage 41 so as to heat the desired area of the intake manifold 2.

Next the mold of operation of the first embodiment with the above-described construction will be described. When the engine switch or key switch 39 is closed to start the engine 1, the temperature of the cooling water is so low that the contact of the temperature sensor 38 is kept closed. As a result, the current flows through the coil 37a of the relay 37 so that the relay contact 37b is closed and consequently the current flows from the upper electrode 18 to the lower electrode 19, whereby the baffle disk 14 is heated.

When the driver depresses the acceleration pedal 6, the throttle valve 5 is opened, increasing the opening between the valve 5 and the small-diameter portion 3a of the intake pipe structure 3. The combustion air is drawn into the engine through the air cleaner 4, air flow meter 8, intake pipe structure 3 and intake manifold 2.

The fuel is injected through the fuel injection valve 9 and sprayed through the nozzle 9a in such a quantity that an optimum air-fuel ratio may be maintained depending upon the operating conditions of the engine 1. More particularly, the fuel is sprayed over the baffle 14 which is spaced apart from the nozzle 9a by a predetermined distance. As the fuel spray impinges against the baffle 14, the spray pressure is decreased and almost all of the fuel adheres to the upper surface of the baffle 14 in the form of a liquid film.

The fuel film spreads radially outwardly toward the edge of the baffle 14 and is finely atomized when it is separated from the baffle 14 due to the air flowing through the opening 15 between the large-diameter portion 3b and the baffle. It is herein to be noted that, at the time when the fuel impinges against the baffle 14, the baffle 14 is heated to a temperature appropriated to improve atomization of the fuel since the electric current is applied to the baffle. The atomized fuel particles are well mixed with the bombustion air so that the uniform charge of air and fuel mixture may be produced.

The mixture of air and atomized fuel particles flows along the downwardly converging inner wall surfaces of the converging portion 16 and the deflector 17 so that the air and the atomized fuel particles are further mixed. When the mixture impinges against the throttle valve 5, it is forced to spread radially outwardly to the edge of the throttle plate 5. When the mixture leaves the edge of the throttle plate 5, it is further atomized by the air passing through the opening defined between the throttle valve 5 and the small-diameter portion 3a at increased velocities. The uniform mixture of the air and the finely atomized fuel particles is thus charged into the engine 1 so that the optimum operations of the engine 1 may be ensured and at the same time the emission of pollutants such as HC may be minimized.

Since the distance between the nozzle 9a of the injection valve 9 and the baffle disk 14 is always maintained constant, the fuel injected through the nozzle 9a may be uniformly distributed over the upper surface of the baffle 14 so that the uneven distribution of the air-fuel mixture may be avoided in the intake pipe structure 3. As described above, the fuel distributed over the upper surface of the baffle disk 14 is atomized as it leaves the whole peripheral edge thereof. Thereafter the atomized fuel particles flow along the inclined surfaces of the downwardly converging portion 16 and deflector 17 towards the axis of the intake pipe structure 3 so that the nonuniform distribution of the air-fuel mixture may be further avoided. Thus the fuel which adheres to the walls of the intake pipe structure 3 may be reduced to a minimum so that the liquid fuel which flows down the interior surfaces of the intake pipe structure 3 may be minimized.

As described elsewhere, the fuel which adheres to the baffle disk 14 is readily vaporized and atomized because the baffle 14 is heated to an appropriate temperature.

When the temperature of the cooling water exceeds 50° C. as the engine 1 warms up, the temperature sensor 38 opens its contact so that the relay coil 37a is de-energized and consequently the relay contact 37b is opened. As a result, no current flows from the upper electrode 18 to the lower electrode 19 of the baffle 14, but since the wall surface of the intake manifold 2 is heated by the cooling water passing through the passage 41, the liquid fuel which impinges against the wall surfaces of the intake manifold 2 is caused to vaporize and then atomized so that the optimum air-fuel mixture may be produced.

Figure 5:
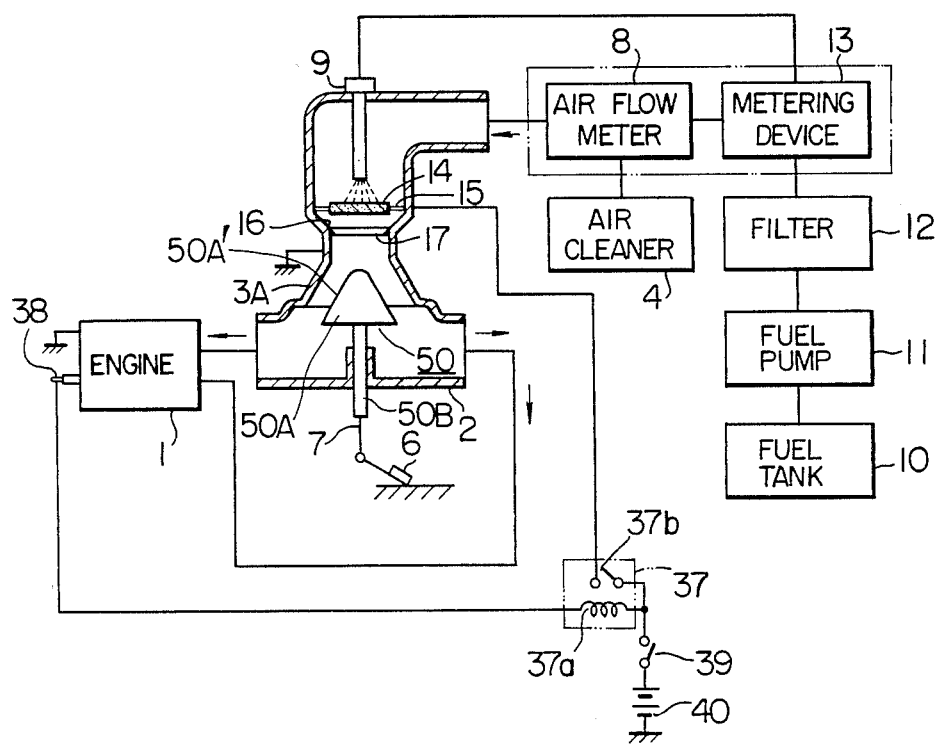

Second Embodiment, FIG. 5

The second embodiment shown in FIG. 5 is substantially similar in construction to the first embodiment described above with reference to FIGS. 1 through 4, except for the structure of the throttle valve 50 and the shape of the associated intake pipe structure 3A. The throttle valve 50 has a valve head 50A and a valve stem 50B having an upper end fixed to the bottom of the valve head and a lower end connected through the linkage 7 with the acceleration pedal 6. The valve head 50A is of conical configuration having a conical head surface 50A' which faces the lower surface of the baffle 14 and downwardly diverges simmetrically with respect to a longitudinal axis of the intake pipe structure 3A. Corresponding to the conical configuration of the head surface 50A', the portion of the wall of the intake pipe structure which surrounds the valve head 50A downwardly diverges. As will be apparent, the throttle valve 50 is movable in a longitudinal direction of the intake pipe structure 3A in accordance with the operation of the acceleration pedal 6 so as to vary an area of the opening defined between the head surface 50A' of the valve head 50A and an inner wall surface of the intake pipe structure. Also it will be apparent that the conical valve head 50A improves the uniformity of the air-fuel mixture charged into the engine.

It is preferable that the fuel injection nozzle 9a is such that the fuel sprayed through the nozzle 9a may be swirled so as to be uniformly distributed over the upper surface of the baffle disk 14.

Figure 6:
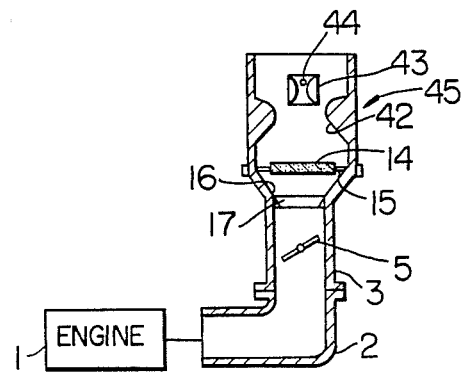
FIGS. 5 and 6 are diagrammatic views of a second embodiment and a third embodiment, respectively, of the present invention.

Third Embodiment, FIG. 6

The third embodiment shown in FIG. 6 is also substantially similar in construction and mode of operation to the first embodiment except that instead of the fuel injection valve 9 and the fuel injection nozzle 9a, a conventional carburetor 45 having a primary venturi 42 and a secondary venturi 43 is used. The fuel is discharged through a discharge nozzle 44 opened at the primary venturi 43.

So far only the preferred embodiments of the present invention have been described, but it is to be understood that various modifications may be effected without departing from the spirit of the present invention as will be briefly described below.

(1) The intake pipe structure 3 has been described as being circular in cross section, but its cross sectional configuration may be varied depending upon the demands of the engine 1. In the latter case, the configuration of the baffle 14 needs to be varied correspondingly.

(2) The baffle 14 may have a conically shaped upper surface so that the uniformity of fuel distribution may be further improved.

(3) Instead of the arrangement for fixing the baffle 14 of the type shown in FIG. 3, the baffles may be fixed in various manners.

(4) Instead of heating the intake manifold 2 with the cooling water, it may be heated by the exhaust gases.

(5) The energization of the baffle 14 has been described as being controlled in response to the temperature of the cooling water which is detected by the temperature sensor 38, but it is to be understood that the control may be effected in response to the temperature of the lubricating oil in the engine 1 or the temperature of the cylinder block.

(6) Furthermore the de-energization of the baffle 14 may be effected by a timer on the assumption that the temperature of the engine 1 reaches a predetermined level a predetermined time interval after starting up.

As will be understood from the foregoing description, the intake system according to the present invention comprises the baffle disposed in the intake pipe structure between the fuel supply means and the throttle valve and spaced apart from the fuel supply means by a predetermined distance, and having the peripheral or outer edge spaced apart from the inner wall surface of the intake pipe structure to define the opening or mixture passage therebetween. As a result, the fuel which is supplied from the fuel supply means is decreased in pressure as it impinges on the baffle and is uniformly spread radially outwardly toward the peripheral edge of the baffle. As the fuel is separated from the peripheral edge, it is atomized by the air flowing through the opening between the baffle and the inner wall surface of the intake pipe structure and the atomized fuel particles are uniformly mixed with the air flowing towards the throttle valve. Further, the baffle is made of a ceramic material having positive resistance-temperature characteristic and definite Curie point and adapted to be heated when the electric current is applied thereto. Thus, the baffle is maintained substantially at a constant temperature at which evaporation and atomization of the fuel can be preferably effected, when the electric current is applied to the baffle.

Consequently, the adhesion of the fuel to the intake pipe wall, the formation of the liquid fuel film thereover and the variation in the air-fuel ratio due to the variation in opening of the throttle valve may be almost eliminated. As a result, the uniformly mixed charge may be uniformly distributed to the cylinders so that the engine performance may be significantly improved and the emission of pollutants may be minimized.

Further, when the electric current supply to the baffle is controlled to interrupt in response to the temperature of a cooling water in the engine as in the illustrated embodiments; more particularly when the current supply is interrupted upon increase of the engine cooling water to a predetermined level, say, 50° C., electric power can be economized. Even if the current supply to the baffle is interrupted, the fuel atomization can be preferably effected since the wall surface of the intake manifold 2 is heated by the cooling water passing through the passage 41, the cooling water being heated above 50° C.

It is additionally to be mentioned that the intake system of the invention is very simple in construction and the concept of the invention may be readily applied to existing intake systems.

What is claimed is:

1. An intake system for an internal combustion engine comprising:
   an intake pipe structure,
   fuel supply means for supplying fuel into said intake pipe structure to form an air-fuel mixture,
   an intake manifold connected between said intake pipe structure and cylinders of said engine for distributing the air-fuel mixture into said cylinders,
   a throttle valve disposed in said intake pipe structure between said fuel supply means and said intake manifold for controlling an amount of the air-fuel mixture to be charged into said cylinders,
   substantially imperforate baffle means disposed in said intake pipe structure between said fuel supply means and said throttle valve in opposition to said fuel supply means with a predetermined distance from the latter for impingement of fuel therefrom on said baffle means, and having an outer edge spaced from an inner wall surface of said intake pipe structure to define an opening therebetween, whereby impinged fuel flows toward said edge and is atomized by flow of air thereby,
   said baffle means including heater means adapted to be heated when electric current is applied thereto, and
   power supply means for supplying electric current to said baffle means.

2. An intake system as set forth in claim 1, wherein said heater means is made of a ceramic material having positive resistance-temperature characteristic and definite Curie point.

3. An intake system as set forth in claim 1 or 2, wherein said power supply means includes means for controlling the electric current supply to said baffle means in response to the temperature of cooling water in said engine.

4. An intake system as set forth in claim 3, wherein said controlling means includes normally closed switch means connected between an electric power source and said baffle means, and a temperature sensor operable to detect the temperature of said cooling water and to operate said switch means to open when the temperature of said cooling water rises above a predetermined level.

5. An intake system as set forth in claim 1 or 2, wherein said fuel supply means includes a fuel injection valve.

6. An intake system as set forth in claim 1, or 2, wherein said throttle valve is of the type which is movable in a longitudinal direction of said intake pipe structure to vary an area of an opening defined between an outer periphery of said throttle valve and the inner periphery of said intake pipe, said throttle valve having a conical outer surface facing said fuel supply means and diverging in the direction opposite to said fuel supply means substantially symmetrically with respect to a longitudinal axis of said intake pipe structure.

7. An intake system as set forth in claim 1, or 2, wherein said throttle valve is of butterfly type.

8. An intake system as set forth in claim 1 or 2, wherein said baffle means has an outer periphery substantially conforming to but spaced from the inner periphery of that portion of said intake pipe structure in which said throttle valve is disposed.

9. An intake system as set forth in claim 1 or 2, wherein said intake pipe structure has a converging portion between said baffle means and said throttle valve.

10. An intake system as set forth in claim 9, further comprising a ring-shaped deflector arranged below said converging portion.

* * * * *